United States Patent
Kobayashi

(10) Patent No.: US 6,646,389 B2
(45) Date of Patent: Nov. 11, 2003

(54) DISCHARGE LAMP IGNITION DEVICE, EQUIPMENT AND IMAGE FORMING APPARATUS

(75) Inventor: Masami Kobayashi, Hiratsuka (JP)

(73) Assignee: Harison Toshiba Lighting Corp., Imabari (JP)

(*) Notice: Subject to any disclaimer, the term of this patent is extended or adjusted under 35 U.S.C. 154(b) by 0 days.

(21) Appl. No.: 10/200,848

(22) Filed: Jul. 22, 2002

(65) Prior Publication Data
US 2003/0020416 A1 Jan. 30, 2003

(30) Foreign Application Priority Data
Jul. 24, 2001 (JP) .......................... 2001-222721

(51) Int. Cl.$^7$ .............................. H05B 37/00
(52) U.S. Cl. ................ 315/209 R; 315/290; 315/224
(58) Field of Search ................ 315/209, 151, 315/248, 224, 209 R, 241, 244, 290; 324/304

(56) References Cited

U.S. PATENT DOCUMENTS

| | | | | |
|---|---|---|---|---|
| 4,005,694 A | * | 2/1977 | Noe | 123/148 |
| 5,489,821 A | * | 2/1996 | Crockett | 315/151 |
| 5,543,690 A | * | 8/1996 | Bernicke et al. | 315/209 R |
| 6,091,208 A | * | 7/2000 | Flory, IV | 315/290 |

FOREIGN PATENT DOCUMENTS

| | | |
|---|---|---|
| JP | 58135563 | 8/1983 |
| JP | 2174097 | 7/1990 |
| JP | 8012794 | 1/1996 |
| JP | 9199285 | 7/1997 |

* cited by examiner

*Primary Examiner*—Don Wong
*Assistant Examiner*—Jimmy T. Vu
(74) *Attorney, Agent, or Firm*—John P. White; Cooper & Dunham LLP

(57) ABSTRACT

An ignition device which ignites a discharge lamp comprises high-frequency voltage generator, a feeding harness line, and a lowpass filter. The high-frequency voltage generator includes a switch for generating a high-frequency voltage through high-frequency switching and an output transformer which outputs a high-frequency voltage. The discharge lamp is ignited by the high-frequency output voltage of the output transformer being applied between its paired electrodes. The feeding harness line has its one end connected to the high-frequency voltage generator and its other end connected to the discharge lamp and includes parallel conductors the length of which is 200 mm or more in length. The lowpass filter bypasses a high-frequency oscillating current which flows at no-load time mainly due to stray capacitance associated with the feeding harness line.

16 Claims, 9 Drawing Sheets

DISCHARGE LAMP IGNITION DEVICE, EQUIPMENT AND IMAGE FORMING APPARATUS

CROSS-REFERENCE TO RELATED APPLICATIONS

This application is based upon and claims the benefit of priority from the prior Japanese Patent Application No. 2001-222721, filed on Jul. 24, 2001, the entire contents of which are incorporated herein by reference.

BACKGROUND OF THE INVENTION

1. Field of the Invention

The present invention relates to a discharge lamp ignition device for igniting a discharge lamp filled with a discharge medium mainly including a rare gas. The invention also relates to equipment and image forming apparatus using such a discharge lamp ignition device.

2. Description of the Related Art

A rare-gas discharge lamp is adapted to emit light from a phosphor with ultraviolet radiation produced by discharge of a rare gas. The lamp has a good rising characteristic of light flux at low temperatures because the amount of light emission is independent of temperature but is low in light emission efficiency in comparison with a mercury-vapor discharge lamp.

To improve the light emission efficiency, on the other hand, pulse-based ignition of a discharge lamp which radiates visible light by exciting a phosphor layer with ultraviolet rays produced by discharge of a rare gas has been disclosed in Japanese Unexamined Patent Publications Nos. 58-135563, 2-174097, 9-199285, and Japanese Patent Publication No. 8-12794. In addition, a discharge lamp ignition device has also been proposed which improves the light emission efficiency by applying a high-frequency alternating-current voltage having its waveform adjusted by being superimposed with a direct-current voltage between paired electrodes of the discharge lamp. At least one of the paired electrodes is placed on the outer surface of the discharge container.

However, the discharge lamp equipped with paired electrodes at least one of which is placed on the outer surface of the discharge container utilizes dielectric barrier discharge and hence is generally very high in starting voltage and lamp voltage.

For this reason, if the high-frequency power supply continues operation at no-load time, it will not so long before that power supply breaks down due to the high voltage generated by the power supply itself. In addition, the application of the aforementioned high voltages will cause the discharge lamp, a feeding harness line and the high-frequency to be subject to dielectric breakdown. The dielectric breakdown leads to a serious problem of occurrence of an abnormal discharge.

Accordingly, we invented protection devices which involve detecting the no-load state of a discharge lamp utilizing dielectric barrier discharge and applied for patents in Japanese Patent Applications Nos. 2000-362207 and 2001-046321. According to this invention, a dielectric barrier discharge lamp is ignited by high-frequency voltage generator having switch and an output transformer, and high-frequency operation detector, controller and no-load detector are provided. The controller feedback controls the switch so that a high-frequency operation detect signal from the high-frequency operation detector goes to a first level to thereby make the high-frequency output constant. Upon detecting the no-load state of the secondary circuit of the output transformer, the no-load detector changes the high-frequency operation detect signal input to the controller to the second level, thereby allowing the switch in the high-frequency voltage generator to perform a protective operation.

When incorporating the discharge lamp utilizing dielectric barrier discharge into equipment, such as an image forming apparatus, as a light source of the reading unit, the discharge lamp and the ignition circuit are commonly connected by a feeding harness line. The harness line is formed of parallel conductors in almost all portions except connecting portions at both ends.

Depending on equipment into which the lamp is incorporated, the feeding harness line may be required to be 200 mm or more in length. It was found that such a long harness line makes the distributed static capacitance of the parallel conductor portion so large that it cannot be neglected for the high operating frequency. That is, in the event of a no-load state due to the discharge lamp being out of connection by way of example, when only the harness line is connected, the load seen by the high frequency generator becomes the distributed capacitance of the harness line. This distributed capacitance is considerably smaller than the interelectrode static capacitance within the discharge container. Moreover, at no-load time, the high frequency generator outputs a high-frequency oscillating current at a resonant frequency which is determined by the distributed capacitance of the harness line and the inductance of the output transformer and which is considerably higher than the normal operating frequency. The no-load detector is prone to recognize erroneously the state where the high-frequency oscillating current is being output as a load state. The erroneous recognition by the no-load detector results in failure to perform the inherent function of detecting the no-load state for protection.

BRIEF SUMMARY OF THE INVENTION

It is an object of the present invention to provide a discharge lamp ignition device which, even if the feeding harness line used is long, exactly responds to a no-load state to perform a protection operation and equipment and image forming apparatus using such an ignition device.

It is another object of the present invention to provide a discharge lamp ignition device which, even if the feeding harness line used is long, exactly responds to a no-load state to perform a protection operation and, when the no-load state is removed by the discharge lamp being restored, provides automatic recovery and equipment and image forming apparatus using such an ignition device.

An ignition device igniting a dielectric barrier discharge lamp according a first embodiment of the present invention comprises: a discharge lamp including a dielectric discharge container filled with a discharge medium; a pair of electrodes at least one of which is disposed on the outer surface of the discharge container and between which a discharge is generated in the container; high-frequency voltage generator, comprising a switch configured to generate a high-frequency voltage and an output transformer which outputs a high-frequency voltage, configured to ignite the discharge lamp by applying the high-frequency output voltage of the output transformer between paired electrodes of the discharge lamp; a feeding harness line having its one end connected to the high-frequency voltage generator and its other end connected to the discharge lamp, the harness line having parallel conductors whose length is 200 mm or more; and a lowpass filter which bypasses a high-frequency oscillating current which flows at no-load time mainly due to stray capacitance associated with the feeding harness line.

A discharge lamp ignition device according to the first embodiment of the present invention comprises: a discharge lamp including a discharge container filled with a discharge medium mainly including a rare gas and a pair of electrodes at least one of which is disposed on the outer surface of the discharge container; a feeding harness line having its one end connected to the discharge lamp, the harness line including parallel conductors the length of which is 200 mm or more; and an ignition circuit connected to the other end of the feeding harness line to ignite the discharge lamp, the ignition circuit including: high-frequency voltage generator, comprising a switch configured to generate a high-frequency voltage and an output transformer which outputs a high-frequency voltage, configured to ignite the discharge lamp by applying the high-frequency output voltage of the output transformer between the paired electrodes of the discharge lamp; no-load detector configured to detect a no-load state based on a current which flows in the secondary circuit of the output transformer; high-frequency oscillating current bypass coupled to the no-load detector configured to bypass a high-frequency oscillating current which flows in the no-load detector at no-load time mainly due to the stray capacitance of the feeding harness line to thereby reduce the high-frequency oscillating current to flow in the no-load detector; and controller, when the no-load detector detects a no-load state, configured to control the high-frequency voltage generator to protect the ignition circuit.

In the description which follows, unless otherwise specified, the definitions and technical meanings of terms used are given as follows:

<Discharge Lamp>

The discharge lamp includes at least a discharge container, a discharge medium, and a pair of electrodes. At least one of the paired electrodes is placed on the outer surface of the discharge container. The discharge medium filled into the discharge container mainly includes a rare gas. Thus, the discharge lamp provides dielectric barrier discharge.

(Discharge Container)

The discharge container may be made of any dielectric material provided that it has air tightness and heat resistance at operating temperatures. It is usually made of soft glass, hard glass, or semi-hard glass. When utilizing visible light for illumination, the discharge container has only to transmit only the visible light. When utilizing ultraviolet radiation for illumination, the discharge container can be made of quartz glass, which allows ultraviolet rays to pass through. Here, "illumination" means all of utilization of light emission from the discharge lamp.

The discharge container is not subject to shape limitations. Thus, the discharge container is allowed to be formed into any shape according to objects of illumination. For instance, the container can be shaped into a tube- or slab-like form. With the tube-like form, either of a straight tube and a bend tube is possible. Further, the bend tube may be in the shape of ring, semi-circle, U, W, saddle, or spiral. Even when the discharge lamp is shaped into a tube-like form, the diameter and length of the tube are not limited. The size may be chosen to suit purposes of illumination.

(Discharge Medium)

The discharge medium mainly includes a rare gas. Xenon is recommended for the rare gas. One or more of krypton, argon, neon, and helium may be mixed into xenon. That the discharge medium mainly includes a rare gas means that the rare gas is allowed to contain halogen or the like and the discharge depends mainly on the rare gas.

(Paired Electrodes)

The paired electrodes have at least one placed on the outer surface of the discharge container. For sake of convenience, the electrode that is placed on the outer surface of the discharge container is referred to as the external electrode. The electrode placed inside the discharge lamp is referred to as the internal electrode. The paired electrodes may be configured such that both are the external electrodes, or one is the external electrode and the other is the internal electrode. When at least one of the paired electrodes is the external electrode, static capacitance resulting from the wall of the discharge container as a dielectric exists between the electrodes, allowing dielectric barrier discharge to be caused.

The external electrode is placed substantially in contact with the outer surface of the discharge container. The electrode is preferably made of a conductive thin film. As the conductive thin film, use may be made of foil of a conducting metal, such as aluminum, silver or copper, a film of a conductive metal deposited on a light-transmissive resin sheet to be described later, a plated film, conductive metal foil, a film formed by screen printing of a conductive paste, an ITO film, or a NESA film. When the external electrode includes a conductive thin film, it may be shaped into a ribbon-like or wave-like form.

However, the external electrode is not limited to a conductive thin film but may be a coil or mesh structure which can be placed substantially in contact with the outer surface of the discharge container. That the external electrode is placed substantially in contact with the outer surface of the discharge container means that, although it is desired that the entire external electrode be in contact with the outer surface of the discharge container, this is not the essential requisite and it is sufficient to cause the external electrode to be generally in contact with the outer surface of the discharge container. Moreover, the external electrode can have a size such that at least its part extends along the length of the discharge container. In the direction of the circumference of the discharge container, the external electrode may be set to within an angle that forms part of the circumference. When the external electrode includes a coil or mesh structure and a transparent conductive film, light emerges to the outside through the external electrode or its crevices; thus, the external electrode can be placed on the entire circumference. In contrast, when the external electrode is made of metal foil, it can be placed on the outer surface of the discharge container by first boding the metal foil to a surface of a light-transmissive resin sheet, then applying an adhesive to the surface of the sheet and putting the sheet around the discharge container. Alternatively, the metal foil may be directly bonded to the outer surface of the discharge container. The external electrode may be varied in width in the direction of the length of the discharge container.

Bringing the external electrode into contact with the outer surface of the discharge container can be attained by first applying an adhesive to the contact surface of the external electrode and then boding the external electrode to the outer surface. Alternatively, an adhesive may be applied to the area of contact of the discharge container with the external electrode, in which case the external electrode is bonded to the adhesive area of the container. Further, it is also possible to put merely the external electrode to the contact area of the discharge container without using any adhesive and wind a light-transmissive resin sheet having an adhesive applied thereto around the discharge container from above the external electrode.

Further, the paired electrode configurations will be described. The electrode configuration used can be selected from the following:

1. Internal/external electrode configuration

This configuration is such that one or more internal electrodes and one or more external electrodes are used in a set. This configuration is divided into one in which the internal electrode is short and one into which the internal electrode is long enough to extend along the length of the discharge container.

(1) Electrode Configuration in Which a Short Internal Electrode is used

In this configuration, a short internal electrode is used as in usual internal-electrode fluorescent lamps.

(1-1) Electrode configuration such that a single internal electrode is placed at one end of the is discharge lamp and a single external electrode is placed on the outer surface of the discharge container.

(1-2) Electrode configuration such that a pair of internal electrodes is placed at both ends of the discharge lamp and a single external electrode is placed on the outer surface of the discharge container.

This configuration is divided into one in which the paired internal electrodes are connected together to one end of an ignition circuit and the external electrode is connected to the other end of the ignition circuit and one in which each of the paired internal electrodes is connected to one end of a respective one of paired ignition circuits and the external electrode is connected to the other ends of the respective ignition circuits.

(1-3) Electrode configuration such that a pair of internal electrodes is placed at both ends of the discharge lamp and a pair of external electrodes is placed on the outer surface of the discharge container.

In this configuration, the internal electrodes and the external electrodes are made opposite to each other in a one-to-one relationship.

(1-4) Configuration such that internal electrodes are placed at both ends and in the intermediate portion of the discharge container and a single external electrode is opposed to each of the internal electrodes.

(1-5) Configuration such that internal electrodes are placed at both ends and in the intermediate portion of the discharge container and external electrodes opposed to the internal electrodes are placed on the outer surface of the discharge container.

(2) Electrode Configuration in Which the Internal Electrode is Long

In this configuration, an internal electrode is used which is long enough to extend over the substantial overall length of the discharge container. There are two structures: one in which both ends of the internal electrode pass through both ends of the discharge container in air-tight manner; and one in which only one end of the internal electrode passes through one end of the discharge container in air-tight manner but the other end of the internal electrode is located inside in the vicinity of the other end of the container.

2. External electrode configuration

In this configuration, a pair of external electrodes are placed on the outer surface of the discharge container so that they are spaced away from each other and opposed to each other. One or more pairs of external electrodes can be disposed along the length of the discharge container. In the case of aperture type, the external electrode should be placed so as not to prevent light transmission through the aperture.

It does not matter whether the paired electrodes are disposed inside or outside the discharge container if at least one of them is disposed so as to allow a discharge to be produced through a discharge medium inside the discharge container.

(Phosphor Layer)

The phosphor layer, which is not the essential requisite of the discharge container in the invention, can be formed on the inner surface side of the discharge container as required. The type of phosphor can be selected freely from existing phosphor materials according to applications of the discharge lamp. For instance, for color image reading purposes, a three-wavelength emitting phosphor can be used. For monochrome image reading purposes, a green emitting phosphor can be used. The phrase "on the inner surface side" is used in a sense to encompass not only direct formation of a phosphor layer on the inner surface of the discharge container but also indirect formation such that a protective film is first formed on the inner surface of the discharge container and a phosphor layer is then formed on that protective film.

<Feeding Harness Line>

The feeding harness line mainly includes a pair of insulation coated conductors, each of which has its one end connected to a respective one of the paired electrodes of the discharge lamp and its other end connected to a respective one of the outputs of the high-frequency voltage generator of the ignition circuit. Thus, the harness line acts as a transmission path for igniting power to the discharge lamp. The feeding harness line is allowed to be equipped at its one end or both ends with a terminal or terminals for connection to either of the discharge lamp and ignition circuit or both. It goes without saying that the harness line may be connected directly to a corresponding portion or portions without using the terminals.

The harness line includes a parallel-line section except at both ends. The "parallel-line section" is the intermediate portion of the harness line and means that insulation coated paired conductors are in parallel with each other. The paired insulated conductors may be integrated by the use of a common insulating coating or may be isolated from each other. In either form, the paired conductors extend in parallel with a small spacing therebetween. When the length of the parallel-line section exceeds 200 mm, therefore, the stray capacitance associated with the parallel-line section becomes non-negligibly large. However, the harness line, if its length is as long as 1000 mm, can meet most of requirements of equipment into which the line is incorporated.

<Ignition Circuit>

In the present invention, the ignition circuit comprises high-frequency voltage generator, no-load detector, high-frequency oscillating current bypass, and controller. Hereinafter, each circuit component will be described in sequence.

(High-Frequency Voltage Generator)

The high-frequency voltage generator is means for supplying high-frequency energy of given voltage and power to the discharge lamp to cause dielectric barrier discharge. It is provided with switch adapted to generate a high-frequency voltage through high-frequency switching and an output transformer which outputs a high-frequency voltage. The high-frequency voltage generator is not subject to any other configuration limitation provided that it applies a high-frequency voltage induced across the secondary winding of the output transformer to the paired electrodes of the discharge lamp to ignite the lamp. In the invention, the high frequency is 1 KHz or more and preferably in the range of 4 to 200 KHz. The high-frequency voltage generator can be provided with a resonance circuit as required in order to produce a sinusoidal voltage. In this case, for stable operation in the lag region, the resonant frequency is set higher than the operating frequency. For example, when the operating frequency is 200 KHz, the resonant frequency can be set at about 500 KHz. The high-frequency energy applied to the discharge lamp may be either in pulsed voltage or alternating voltage form. In the alternative voltage form, positive and negative waveforms are applied alternately and continuously to the discharge lamp. The alternative voltage may be symmetrical or asymmetrical for positive and negative waveforms. For example, harmonic waves can be superimposed on a sinusoidal fundamental wave to make abrupt rising and falling portions of a voltage waveform. A dc voltage can be superimposed to make a voltage waveform asymmetrical. By adjusting the waveform of the high-frequency alternating voltage so that a lamp current having sufficient idle periods will flow, afterglow can be produced in the discharge lamp during the idle periods of the lamp current as with the case where a pulse voltage is applied.

As the high-frequency voltage generating circuit, an inverter or switching regulator is generally used; however, this is not restrictive. For example, an oscillator and a power amplifier may be used in combination.

The output transformer is adapted to isolate the primary and secondary windings from each other and is required to have at least primary and secondary windings. That is, the output transformer is allowed to have a ternary winding or more than one primary or secondary winding. Since the discharge lamp makes dielectric barrier discharge by being supplied with an output voltage induced across the secondary winding of the output transformer, it is required to set high the voltage induced across the secondary winding. Thus, the output transformer is preferably a step-up transformer but may be a step-down or one-to-one transformer.

The switch is adapted to generate a high-frequency voltage through switching action and can be made of an inverter, a switching regulator, or the like. The number of the switch may be one or more according to the type of circuit used. The switch can use a semiconductor switch, such as a MOSFET, a bipolar transistor, or the like.

Thus, the high-frequency voltage generator can be constructed by connecting the primary winding of the output transformer and the switch in series across a DC power supply. The DC power supply may be a rectifier-filter-based power supply or a battery. The switch switches a DC voltage at a high frequency to generate a high-frequency voltage. The output transformer outputs the high-frequency voltage to the secondary winding electrically insulated from the primary winding connected to the switch.

(No-Load Detector)

The no-load detector detects a no-load state of the discharge lamp based on a current flowing through the secondary winding of the output transformer, i.e., lamp current. Upon detecting a no-load state, the detector controls the high-frequency voltage generator to perform a protective operation. For example, the secondary current can be detected by inserting a current-detecting impedance of small value or a current transformer in series with the secondary winding. The no-load detector is also allowed to have circuit for discriminating between load and no-load states from the magnitude or waveshape of the secondary current and means which responds to the result of discrimination. In any case, when a no-load state is detected by the no-load detector, the controller is instructed directly or indirectly to perform a protective operation.

(High-Frequency Oscillating Current Bypass)

The high-frequency oscillating current bypass is adapted to prevent erroneous recognition by the no-load detector based on a high-frequency oscillating current which is leakage current due to stray capacitance associated with the harness line and flows through the secondary winding of the output transformer at no-load time. To this end, the high-frequency oscillating current bypass functions to allow the high-frequency oscillating current to substantially bypass the no-load detector. Specifically, a capacitor or a series combination of a capacitor and a resistor is connected in parallel with the current detecting element in the no-load detector, whereby the high-frequency oscillating current is shunted.

(Controller)

The controller is adapted to perform abnormal-time control on the high-frequency voltage generator for protective operation at no-load time. The protective operation is to provide protection against danger due to no-load state by stopping the high-frequency voltage generation, generating the high-frequency voltage in intermittent manner, or generating a low, high-frequency voltage.

Also, the controller can be configured to allow the high-frequency voltage generator to perform feedback control on the switch at normal time. Thereby, the high-frequency voltage generator comes to perform an operation of feedback control type. A section for performing the protective operation at no-load time and a section for performing feedback control at normal time may be arranged separately or integrally. In the latter case, an IC, such as a switching regulator IC, can be used as the main component.

<Workings of the Embodiment>

In the embodiment, when the no-load detector detects a no-load state of the secondary side of the output transformer, the controller responds to the no-load detector to control the high-frequency voltage generator so as to perform a protective operation. That is, since the length of the parallel section of the feeding harness line connected between the high-frequency voltage generator and the discharge lamp is 200 mm or more, the stray capacitance of the line is non-negligibly large. For this reason, a high-frequency oscillating current of a higher frequency than the normal operating frequency flows out of the high-frequency voltage generator as a leakage current at no-load time. This leakage current is comparable in magnitude to the normal lamp current because the stray capacitance of the harness line is relatively large and is therefore easy to be recognized by the no-load detector by mistake. However, the bypass allows this high-frequency oscillating current to bypass the no-load detector, making it difficult to recognize the high-frequency oscillating current as a load state.

Therefore, the no-load detector is allowed to detect true no-load states only and consequently the controller is allowed to control the high-frequency voltage generator exactly, providing highly reliable protective operation.

A discharge lamp ignition device according to a second embodiment of the present invention comprises: a discharge lamp including a discharge container filled with a discharge medium mainly including a rare gas and a pair of electrodes at least one of which is disposed on the outer surface of the discharge container, the interelectrode internal stray capacitance within the discharge container being CIE and the interelectrode creepage stray capacitance across the surface of the discharge container being CSF; a feeding harness line having its one end connected to the discharge lamp, the harness line including parallel conductors and having a stray capacitance of CHN associated with the parallel conductors; and an ignition circuit connected to the other end of the feeding harness line to ignite the discharge lamp, the ignition circuit including: high-frequency voltage generator, comprising a switch for generating a high-frequency voltage through high-frequency switching and an output transformer which outputs a high-frequency voltage, configured to ignite the discharge lamp by applying the high-frequency output voltage of the output transformer between the paired electrodes of the discharge lamp; no-load detector configured to detect a no-load state based on a current which flows in the secondary circuit of the output transformer; high-frequency oscillating current bypass coupled to the no-load detector configured to bypass a high-frequency oscillating current which flows in the no-load detector at no-load time mainly due to the stray capacitance of the feeding harness line to thereby reduce the high-frequency oscillating current to flow in the no-load detector; and controller, when the no-load detector detects a no-load state, configured to control the high-frequency voltage generator to protect the ignition circuit, the capacitances CIE, CSF and CHN being set to satisfy CIE>CHN>CSF.

When CIE>CHN>CSF, the high-frequency oscillating current of leakage current flowing through the harness line at no-load time becomes comparable in magnitude to the lamp current at load time, thus causing the no-load detector to tend to make erroneous recognition.

According to this embodiment, however, since the ignition device is configured as described above, the no-load becomes freed from erroneous recognition. As long as CHN satisfies the above condition, the harness line is allowed to have any length.

The discharge lamp ignition device according to the third embodiment further comprises high-frequency operation detector configured to detect a high-frequency voltage to output and supply a high-frequency operation detect signal to the controller, and wherein the controller, upon receiving the high-frequency operation detect signal, feedback controls the switch so that the high-frequency operation detect signal goes to a first level and, when the high-frequency operation detect signal goes to a second level, protects the switch, and the no-load detector, when detecting a no-load state, forces the high-frequency operation detect signal to go to the second level.

This embodiment is configured to make the high-frequency output constant through feedback control of the high-frequency output by the high-frequency voltage generator, allowing the circuit configuration to be simplified. That is, the high-frequency output feedback control is achieved by providing the high-frequency operation detector and adding a feedback control function to the controller. In addition, changing the high-frequency operation detect signal between the first and second levels allows the controller to provide feedback control and protection control. Detailed descriptions will be given hereinafter.

<High-Frequency Operation Detector>

The high-frequency operation detector is adapted to output a negative feedback signal for outputting a stable high-frequency voltage as the high-frequency operation detect signal by negative feedback control of the operation of the switch of the high-frequency voltage generator. The form of the high-frequency operation detect signal is selected according to the type of negative feedback control. That is, for constant voltage control, a high-frequency voltage is detected. For constant current control, a high-frequency current is detected. For constant power control, power, i.e., a high-frequency voltage and a high-frequency current are detected. Either of voltage and current can be detected on the primary or secondary side of the output transformer. Since the output transformer used is generally a step-up transformer and in view of insulation between the primary side and the secondary side, it will be easier to detect voltage on the primary side.

In detecting high-frequency voltage and current for constant power control, each of them may be detected separately or a single detecting circuit may be used for pseudo-detection of voltage and current. The detecting circuit can be configured variously using existing means.

<Controller>

The controller is adapted to perform feedback control on the switch in the high-frequency voltage generator at normal time and no-load time control on the switch for protection operation at no-load time. The section for feedback control and the section for no-load time control may be constructed separately or may be integrated with each other through the use of an IC, such as a switching regulator IC. In particular, the use of a regulator IC having a shutdown function results in ease of control to be described later. The use of such a regulator IC having a shutdown function in the main part of the controller and the utilization of the shutdown function for protection operation to stop the high-frequency voltage generation keep control from being accompanied by hunting and moreover effect accurate control and quick response. In addition, the circuit packaging becomes simplified.

The controller performs normal-time feedback control when the high-frequency operation detect signal input thereto is at the first level. The feedback control is to make power, current or power constant through the feedback of high-frequency output that activates the discharge lamp in the form of voltage, current or power to the switch for PWM, frequency or voltage control thereof. The controller, when the high-frequency operation detect signal input thereto goes to the second level, performs protection operation control. The first level means other than the second level to be described later. That is, the controller is configured to receive the high-frequency operation detect signal and is responsive to the signal to feedback control the switch in the high-frequency voltage generator so that the high-frequency operation detect signal goes to the first level at normal time. The controller, if it includes an IC with the shutdown function, can perform a protection operation at no-load time with ease and reliability by performing the shutdown function when the high-frequency operation detect signal goes to the second level. Thus, the control of the switch in the high-frequency voltage generator becomes facilitated.

In addition, the controller can be configured to stop the protective operation only during a given period at the start of the discharge lamp. At the start of the discharge lamp, a very high voltage is applied to the lamp and abnormal discharge (as opposed to main discharge through the discharge medium) is prone to occur for a short time. By thus configuring the controller, a transient state at the start of the discharge lamp can be avoided to perform a reliable protective operation.

<No-Load Detector>

In order to force the high-frequency operation detect signal input to the controller to go to the second level when a no-load state is detected, the no-load detector is provided with a switch and configured to short-circuit partially or entirely or open the high-frequency operation detect signal output circuit of the high-frequency operation detector through the use of the switch, thereby reducing the detect signal level. Alternatively, the high-frequency operation detect signal may be amplified to increase its level. It will therefore be understood that the second level may be any level if it is clearly different from and can be electrically distinguished from the level that the high-frequency operation detect signal usually exhibits at normal time.

<Workings of this Embodiment>

In the present embodiment, the discharge lamp is ignited with a constant high-frequency output and, when a no-load state of the secondary circuit of the output transformer is detected, the high-frequency operation detect signal input to the controller is forced to go from the first level to the second level, thereby controlling the switch in the high-frequency voltage generator to perform a protective operation at no-load time and hence allowing a suitable protective operation to be performed quickly.

Since the controller is used for feedback control at normal time and the level of the high-frequency operation detect signal input thereto is changed forcibly for protective operation, the circuit arrangement becomes simple and relatively inexpensive.

In the discharge lamp ignition device according to a fourth embodiment of the present invention, the high-frequency operation detector detects a lamp voltage or current of the discharge lamp and the controller PWM (pulse width modulation) controls the switch of the high-frequency voltage generator so as to make the lamp voltage or current constant.

This embodiment defines a configuration in which the high-frequency output control can be performed easily in pulse-igniting a discharge lamp adapted for dielectric barrier discharge.

That is, for constant voltage control, the high-frequency operation detector detects a lamp voltage of the discharge lamp or a quasi-signal corresponding to that voltage and inputs it to the controller as a high-frequency operation signal. For constant power control, the high-frequency operation detector detects a lamp voltage or current of the discharge lamp or a quasi-signal for that voltage or current and inputs it to the controller as a high-frequency operation signal.

The controller PWM controls the switch of the high-frequency voltage generator by controlling the phase of the drive signal on the basis of the high-frequency operation signal.

The high-frequency voltage generator produces a PWM-controlled high-frequency output across the secondary winding of the output transformer. As a result, the discharge lamp is ignited by high-frequency pulses. The discharge lamp is lit so that the lamp voltage or the lamp power (i.e., the lamp voltage and the lamp current) becomes constant.

This embodiment allows the constant voltage or power control of the discharge lamp to be made easy in pulse ignition the discharge lamp adapted for dielectric barrier discharge and the circuit configuration to be made relatively simple.

In a discharge lamp ignition device according to a fifth embodiment of the present invention, the feeding harness line is set to be 20 mm or less in the spacing between its parallel conductors.

In many cases, the discharge lamp is placed away from the ignition circuit by making the harness line long and moreover set movable relative to the ignition circuit. In such a case, if the spacing of the parallel conductors exceeds 20 mm, the harness line was found to obstruct smooth spatial movement of the discharge lamp.

Thus, in the present embodiment, the spacing of the parallel conductors of the harness line is set to 20 mm or less. The minimum spacing will be about 1 mm because of the presence of insulating coating that surrounds the conductors. The spacing is preferably 20 mm or less in terms of mobility and 1 mm or more in terms of insulation. The conductors are each of the order of 0.3 to 2 mm in diameter and the insulating coating is of the order of 0.2 to 1 mm in thickness.

Equipment according to an embodiment of the present invention comprises an equipment body; and a discharge lamp ignition device incorporated in the equipment body, which has been described so far.

This embodiment is adapted to all equipment that utilizes light emission of a discharge lamp connected to output terminals of a discharge lamp ignition device and provided with an air-tight discharge container filled with a discharge medium mainly including a rare gas and a pair of electrodes at least one of which is placed on the outer surface of the discharge container.

The equipment body refers to all components that comprise the equipment other than the discharge lamp ignition device.

Equipment includes lighting equipment, image reading apparatus, facsimiles, scanners and copying machines which have the image reading apparatus built in, backlighting equipment for liquid crystal display, and in-car meter pointers.

In particular, the discharge lamp used in this embodiment is easily configured so as to conduct light to outside through the slit between the electrodes because at least one of the electrodes is placed on the outer surface of the discharge container and hence suitable for use with image reading apparatus and backlighting equipment. However, by making the external electrode light-transmissive or allowing light to emerge from gap or gaps in the external electrode, the directivity of light can be eliminated. Thus, the equipment can also be used as directivity-free lighting equipment.

An image forming apparatus according to an embodiment of the present invention comprises an image forming apparatus body equipped with a movable scanner; and a discharge lamp ignition device of the type described herein having a discharge lamp incorporated into the movable scanner and an ignition circuit placed in position in the image forming apparatus body.

This embodiment specifies the configuration of image forming apparatus in which the feeding harness line used is long. In this embodiment, the image forming apparatus includes apparatus which is equipped with a scanner and adapted to read an image for image formation. Examples of such apparatus include scanners, facsimiles, and copying machines. The movable scanner refers to a type of scanner which moves to scan the image of an original that remains stationary. Even a construction such that an original and a scanner are moved in the opposite or the same direction is also included in the movable scanner.

The discharge lamp and the ignition circuit are spaced away from each other and the discharge lamp is incorporated into the movable scanner. The ignition circuit is put and fixed in position. The feeding harness line electrically connects them. Thus, the harness line is inevitably made long.

According to this embodiment, only the discharge lamp is placed in the movable scanner and the ignition circuit is fixed in position, allowing the mass of the movable scanner to be small. For this reason, the scanning speed of the movable scanner can be increased. Thus, high-speed image formation apparatus can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

The preferred embodiments of the present invention will be described hereinafter with reference to the accompanying drawings.

Figure 1:
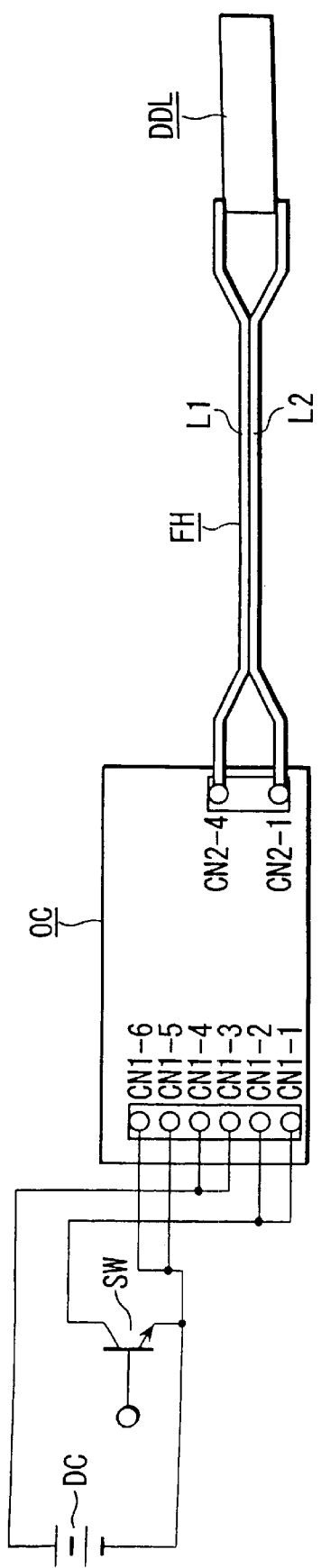
FIG. 1 is a schematic diagram of a discharge lamp ignition device according to a first embodiment of the present invention.
Figure 3:
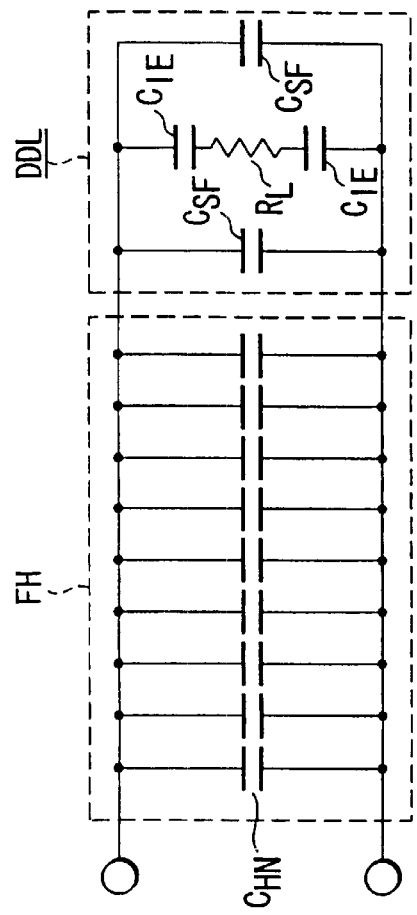
FIG. 3 shows equivalent circuits of the feeding harness line and the discharge lamp of the first embodiment of the discharge lamp ignition device of the present invention.
Figure 2:
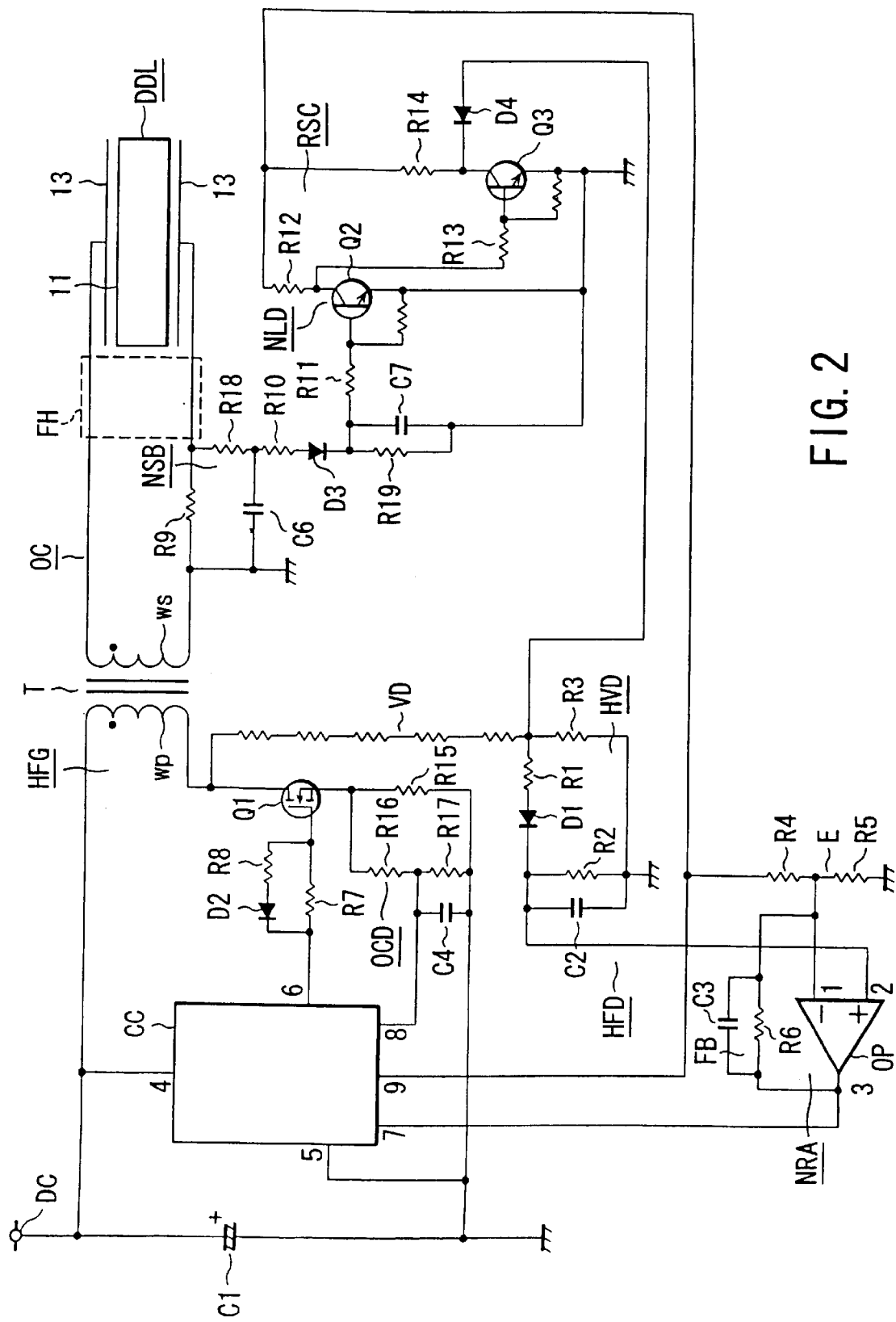
FIG. 2 is a circuit diagram of the first embodiment of the discharge lamp ignition device of the present invention.
Figure 4:
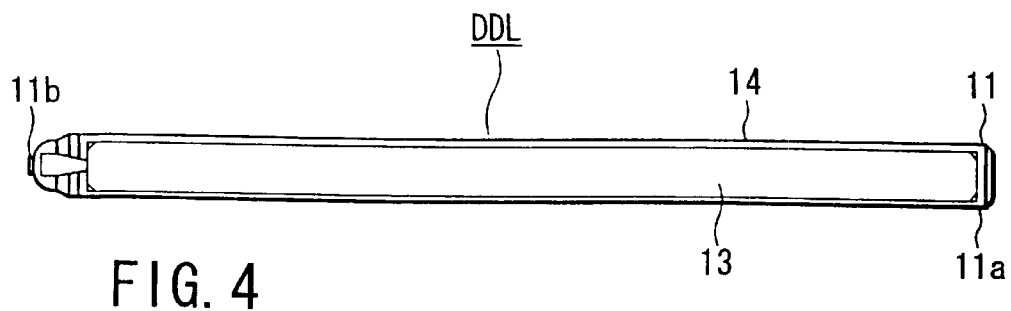
FIG. 4 is a front view of the discharge lamp of the first embodiment of the discharge lamp ignition device of the present invention.
Figure 5:
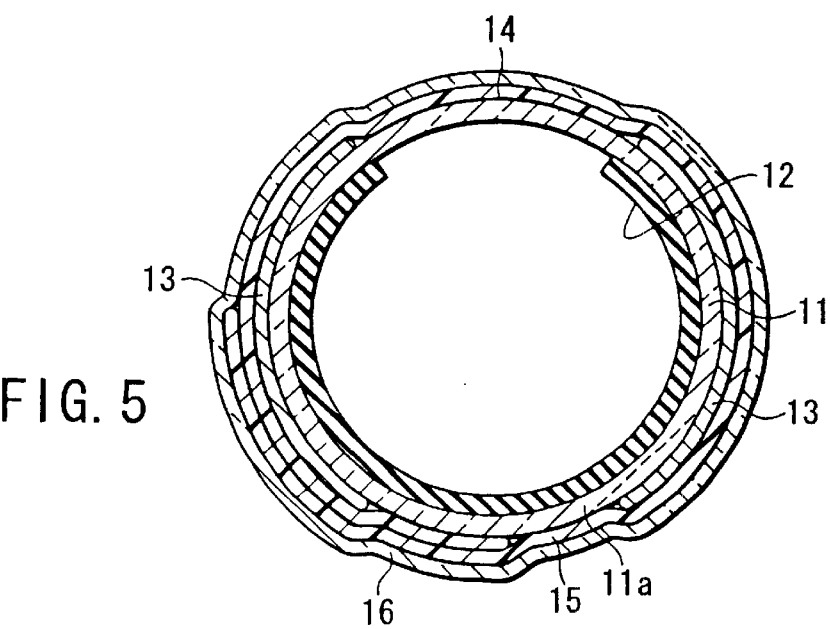
FIG. 5 is an enlarged cross-sectional view of the discharge lamp of the first embodiment of the discharge lamp ignition device of the present invention.
Figure 6:
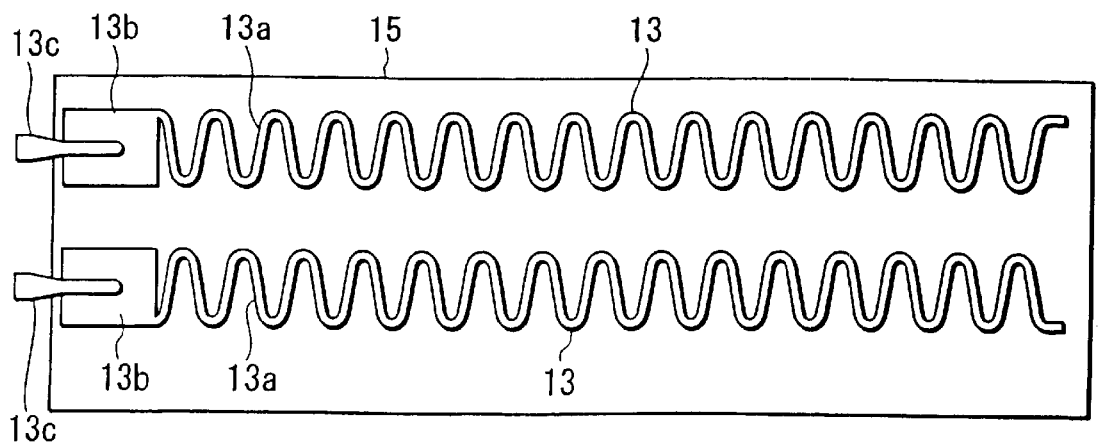
FIG. 6 shows a development of a light-transmissive resin sheet and external electrodes of the first embodiment of the discharge lamp ignition device of the present invention.

FIG. 1 is a schematic illustration of a first embodiment of a discharge lamp ignition device of the present invention. FIG. 2 shows a circuit arrangement of the discharge lamp ignition device of FIG. 1. FIG. 3 shows equivalent circuits of the feeding harness line and the discharge lamp of FIG. 1. FIG. 4 is a front view of the discharge lamp. FIG. 5 is an enlarged cross-sectional view of the discharge lamp. FIG. 6 shows a development of the external electrodes and the light-transmissive resin sheet of the discharge lamp.

In FIG. 1, DC denotes a direct-current power supply, SW denotes a power switch, OC denotes an ignition circuit unit, FH denotes a feeding harness line, and DDL denotes a discharge lamp. Each constituent element will be described in sequence below.

<Direct-Current Power Supply DC>

The direct-current power supply DC rectifies commercial AC input and smoothes the rectified output. The power supply has its negative terminal grounded. In FIG. 2, C1 denotes a smoothing capacitor.

<Power Switch SW>

The power switch SW includes a transistor connected between the direct-current power supply DC and the ignition circuit unit OC.

<Ignition circuit unit OC>

The ignition circuit unit OC has input terminals CN1-1 through CN1-6 and output terminals CN2-1 and CN2-4. As shown in FIG. 2, the ignition circuit unit comprises high-frequency voltage generator HFG, high-frequency operation detector HFD, controller CC, no-load detector NLD, no-load time high-frequency oscillating current bypass NSB, and overcurrent detector OCD.

<High-Frequency Voltage Generator HFG>

The high frequency generator HFG, which includes a switching regulator, has a step-up output transformer T and switch Q1. The output transformer T is formed as an insulating-type transformer having a primary winding wp and a secondary winding ws with polarities indicated. The switch Q1 is comprised of a MOSFET. The primary winding wp of the output transformer T and the switch Q1 are connected in series across the direct-current power supply DC.

The high frequency generator HFG induces high-voltage, high-frequency pulses across the secondary winding of the output transformer T as a result of the switch Q1 being controlled by the controller CC which will be described later.

<High-Frequency Operation Detector HFD>

The high-frequency operation detector HFD comprises a high-frequency voltage detecting unit HVD and a noninverting amplifier NRA. The high-frequency voltage detecting unit HVD is constructed from a voltage divider VD, resistors R1 and R2, a diode D1, and a capacitor C2. The voltage divider VD is connected between ground and the connection point of the primary winding wp of the output transformer T and the switch Q1. The voltage across the resistor R3 is applied across a parallel circuit of the resistor R2 and the capacitor C2 through the resistor R1 and the diode D1. The high-frequency voltage appearing across the primary winding wp is divided by the voltage divider DV, and the divided voltage across the resistor R3 of the voltage divider VD is rectified through the diode D1 and then integrated by the resistor R2 and the capacitor C2.

The noninverting amplifier NRA includes an operational amplifier OP, a reference voltage source E, and a feedback circuit FB. The operational amplifier OP has an inverting input terminal 1, a non-inverting input terminal 2, and an output terminal 3. The inverting input terminal 1 is connected to the output of the reference voltage source E. The non-inverting input terminal 2 is connected to the output of the high-frequency voltage detecting unit HVD. The output terminal 3 is connected to a switching control input terminal 7 of the controller CC which will be described later. The reference voltage source E includes resistors R4 and R5 connected in series between a direct-current power supply provided from the controller CC and ground. The reference voltage appears across the resistor R5. The feedback circuit FB is made up of a resistor R6 and a capacitor C3 connected in parallel between the inverting input terminal 1 and the output terminal 3 of the operational amplifier OP.

<Controller CC>

The controller CC, which includes a switching regulator IC having a shutdown function, has power supply terminals 4 and 5, a gate drive signal output terminal 6, a switching control input terminal 7, an overcurrent control input terminal 8, and a direct-current power supply terminal 9. The power supply terminals 4 and 5 are connected to the positive and negative terminals, respectively, of the direct-current power supply DC. The gate drive signal output terminal 6 is connected to the gate of the switch Q1 by a parallel circuit of a resistor R7 and a series circuit of a diode D2 an a resistor R8. The switching control input terminal 7 is connected, as described previously, to the output terminal 3 of the noninverting amplifier NRA. The overcurrent control input terminal 8 is connected to the output of the overcurrent detector OCD. The direct-current power supply terminal 9 is connected to the reference voltage source E and the no-load detector NLD to provide a direct-current supply voltage to them.

<No-Load Detector NLD>

The no-load detector NLD includes a secondary high-frequency current detector R9 and a reversing switch circuit RSC. The secondary high-frequency current detector R9, which is comprised of a resistor low in resistance, is connected between the secondary winding ws of the output transformer T and the discharge lamp DDL. The connection point of the secondary high-frequency current detector R9 and the secondary winding ws is connected to ground.

The reversing switch circuit RSC mainly includes switches Q2 and Q3 each of a bipolar transistor and an integrating circuit comprising a capacitor C7 and a resistor R19. The switch Q2 has its base connected to the output of the integrating circuit through a resistor R11, its collector connected through a resistor R12 to the direct-current power supply terminal 9 of the controller CC, and its emitter connected to ground. The integrating circuit has its one terminal (output) connected to the nongrounded terminal of the secondary high-frequency current detector R9 through a resistor R18 of the no-load time high-frequency oscillating current bypass NSB to be described later, a diode D3, and a resistor R10 and its other terminal connected to ground. The switch Q3 has its base connected through a resistor R13 to the collector of the switch Q2, its collector connected through a resistor R14 to the direct-current power supply terminal 9 of the controller CC, and its emitter connected to ground. The collector of the switch Q3 is connected through a diode D4 to the nongrounded terminal of the resistor R3 of the high-frequency voltage detector HVD so that the resistor R3 may be short-circuited by the switch Q3.

<No-Load Time High-Frequency Oscillating Current Bypass NSB>

The no-load time high-frequency oscillating current bypass NSB includes a series circuit of a capacitor C6 and a resistor R18 and is connected in parallel with the secondary high-frequency current detector R9 of the no-load detector NLD.

<Overcurrent Detector OCD>

The overcurrent detector OCD includes a current detecting element R16, resistors R16 and R17, and a spike suppressing capacitor C4. The current detecting element R16, which comprises a resistor low in resistance, is inserted between the source of the switch Q1 of the high frequency generator HFG and ground. A voltage drop across the current detecting element R15 is voltage divided by the resistors R16 and R17, the voltage across the resistor R17 being used as a current detect signal. The spike suppressing capacitor C4 is adapted to, in the event that the current detect signal voltage obtained across the resistor R17 contains spikes, remove them. The spike-removed current detect signal is applied to the overcurrent control input terminal 8 of the controller CC.

<Feeding Harness Line FH>

The feeding harness line FH is formed from a pair of polyethylene-insulated conductors which are made integral with each other. Each of the paired conductors has its one end connected to a respective one of the output terminals CN2-1 and CN2-4 of the ignition circuit OC and its other end connected to a respective one of the paired electrodes 13 of the discharge lamp DDL to be described later. The intermediate portion of the harness line is constructed, as shown in FIG. 3, from parallel conductors L1 and L2 between which stray capacitance CHN exists. The spacing between the parallel conductors is set to about 5 mm.

<Discharge Lamp DDL>

The discharge lamp DDL is energized from the high-frequency voltage generator HFG in the ignition circuit unit OC through the feeding harness line FH connected to its paired electrodes 13.

The discharge lamp DDL comprises a discharge container 11, a phosphor layer 12, paired external electrodes 13, an aperture 14, a light-transmissive resin sheet 15, and a light-transmissive insulating tube 16. The lamp is equivalently represented, as shown in FIG. 1, by interelectrode internal capacitance CIE, load resistance R1, and interelectrode creepage (surface) capacitance CSF across the surface of the discharge container. The interelectrode internal capacitance CIE and the load resistance RL are connected in series, and the interelectrode creepage capacitance is connected in parallel with the interelectrode internal capacitance CIE and the load resistance RL. Each capacitance is set to meet the requirements of CIE>CHN>CSF. The interelectrode internal capacitance CIE is a composite of series capacitances, while the interelectrode creepage capacitance CSF is a composite of parallel capacitances.

The discharge container 11 is made of a glass bulb 11a which is 8 mm in diameter and 272 mm in effective length and hermetically sealed at both ends. The tube is equipped at its one end with an exhaust tip-off unit 11b and filled with xenon as a discharge medium.

The phosphor layer 12 is formed on the inner surface of the discharge container 1 except a longitudinal slit-like portion.

The paired external electrodes 13 are each made of aluminum foil and formed so as to meander in a wave-like form as shown in FIG. 4. Overall, the electrodes are placed on the outer surface of the discharge container 11 so that they are opposed to each other with the tube interposed therebetween as shown in simplified form in FIGS. 2 and 3. The external electrodes 13 are first bonded to a surface of the light-transmissive resin sheet 15 to be described later and then located in predetermined positions on the outer surface of the tube 11 by putting that sheet around the tube.

Each of the external electrodes 13 includes a wave-like main portion 13a, a terminal connection portion 13b, and a terminal 13c. The wave-like main portion 13a is formed to extend over most of the lengthwise dimension of the tube 11. The terminal connection portion 13b is connected to one end of the electrode main portion 13a and has a square shape so that the area of contact with the terminal 13c is made large.

The terminal 13c is glued to the terminal connection portion 13b with a conductive adhesive so that it protrudes from the light-transmissive resin sheet 15 and the light-transmissive thermal contraction tube 16.

The aperture 14 is formed by that portion of the discharge container 11 which is not formed with the phosphor layer 12. Therefore, the inside of the discharge container 11 is visible through the aperture 13.

The light-transmissive resin sheet 15, consisting of transparent PET, has a length corresponding to the overall length of the discharge container 11 and a width large enough to cover the circumference of the discharge container 11. As described previously, the paired electrodes 13 are bonded to the surface of the sheet 15 with a given spacing therebetween and an acrylic resin-based adhesive is applied to the surface of that sheet. The sheet 15 is then bonded to the outer surface of the discharge container 11 so that the electrodes 13 are located on opposite sides of the aperture 14. In this case, the aperture 14 is also covered with the sheet 15.

The light-transmissive insulation tube 16, which is made of a transparent fluororesin, entirely covers the discharge container 11, the external electrodes 13 and the aperture 14.

<Circuit Operation>

1. Normal Operation

The high frequency generator HFG induces a high voltage of a high-frequency across the secondary winding ws of the output transformer T because the switch Q1 and the output transformer T act as a switching regulator. The output high-frequency voltage is applied between the external electrodes 13 of the discharge lamp DDL, thereby starting and igniting the discharge lamp. When the discharge lamp DDL is ignited, ultraviolet rays are radiated by dielectric barrier discharge of xenon within the lamp and strike the phosphor layer 12, whereby the phosphor is excited to produce visible light.

Through the high-frequency voltage generating operation of the high-frequency voltage generator HFG, a voltage-divided voltage proportional to the high-frequency voltage on the primary side appears across the resistor R3 of the voltage divider VD in the high-frequency voltage detecting unit HVD of the high-frequency operation detector HFD. This voltage is rectified by the diode D1, then integrated by the resistor R2 and the capacitor C2 and applied to the noninverting input terminal 2 of the operational amplifier OP of the noninverting amplifier NRA. The operational amplifier OP therefore amplifies the difference between the integrated voltage and the reference voltage and then outputs at its output terminal 3 a high-frequency operation detect signal, which is, in turn, applied to the switching control input terminal 7 of the controller CC. The controller CC performs operations based on the input high-frequency operation detect signal to feedback control the on-duty of the switch Q1 so that the high-frequency operation detect signal is maintained at a substantially constant first level. As a result, the high-frequency voltage is constant-voltage controlled.

In the no-load detector NLD, when the discharge lamp DDL is normally connected to the secondary winding ws of the output transformer T and ignited, a current flows into the base of the switch Q2 of the reversing switch circuit RSC because a voltage drop is produced across the secondary-side high-frequency current detector R9. As a result, the switch Q2 is turned on and hence its collector voltage goes to nearly zero. In the no-load detector NLD, the switch Q3 is turned off because its base potential goes low. Therefore, the no-load detector NLD produces no output signal.

Figure 7:
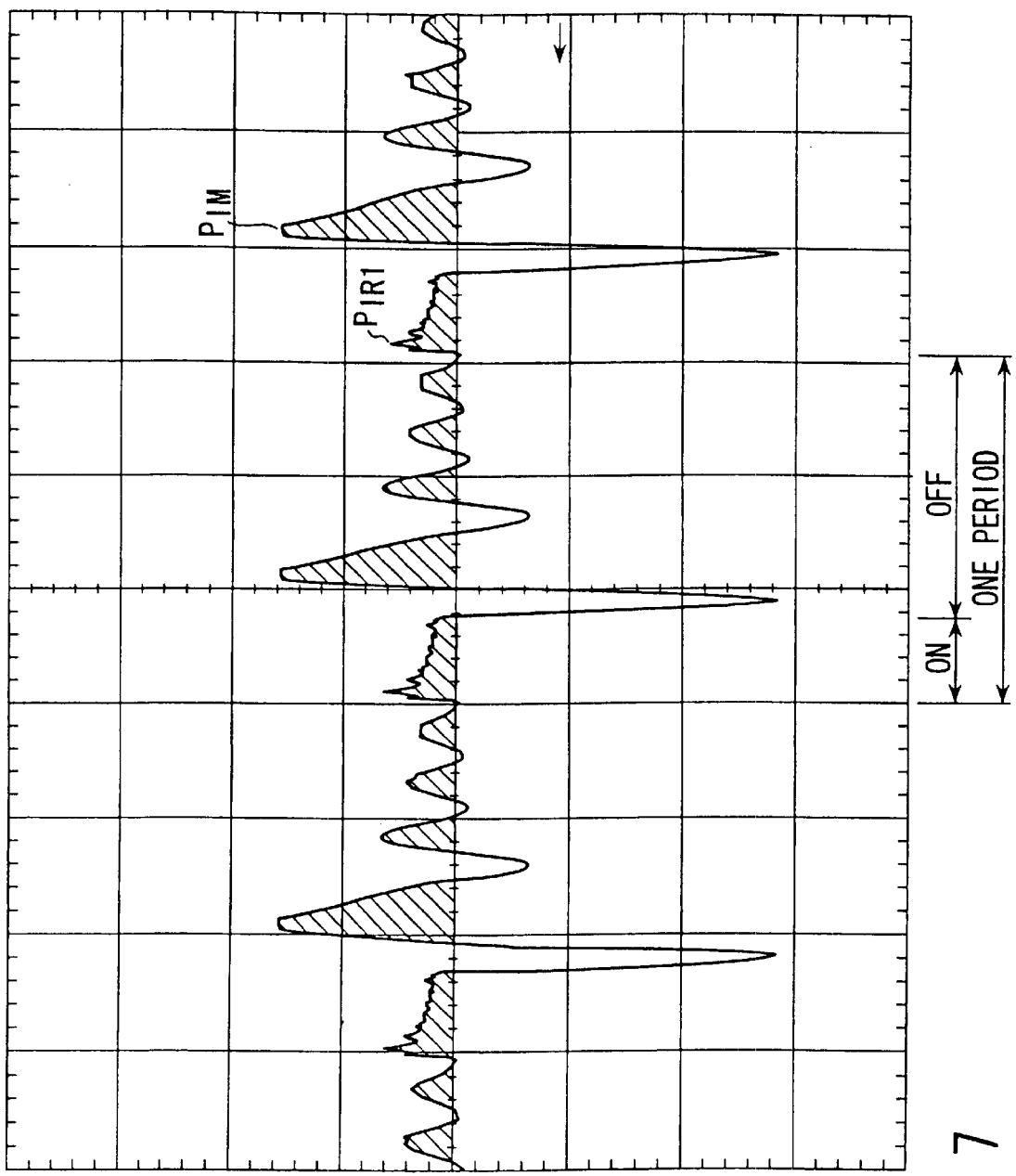
FIG. 7 is a graph illustrating a voltage waveform across the secondary-side high-frequency current detector R9 when the discharge lamp is lit in the first embodiment of the discharge lamp ignition device of the present invention.
Figure 8:
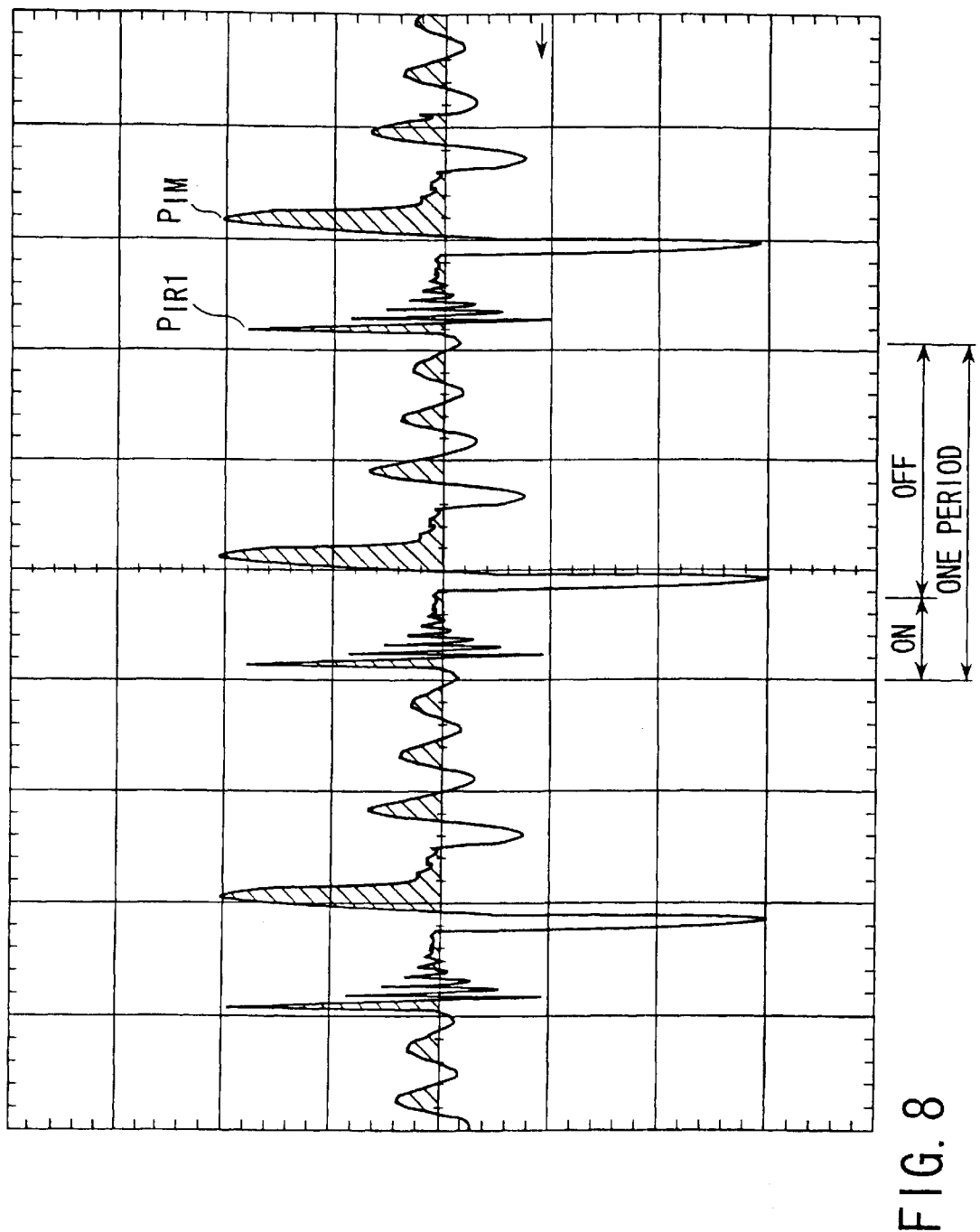
FIG. 8 is a graph illustrating a voltage waveform appearing across the secondary-side high-frequency current detector R9 when the discharge lamp is lit in a comparative example.

The no-load-time high-frequency oscillating current bypass NSB connected in parallel with the secondary-side high-frequency current detector R9 has its impedance set relatively high for the normal (no load time) high-frequency output from the output transformer T and therefore absorbs and bypasses unwanted components which are very high in frequency as is evident from comparison between FIGS. 7 and 8. Accordingly, the secondary-side high-frequency current detection is not affected.

FIG. 7 is a graph illustrating a voltage waveform appearing across the secondary-side high-frequency current detector R9 when the discharge lamp is lit in the first embodiment of the discharge lamp ignition device of the present invention.

FIG. 8 is a graph illustrating a voltage waveform appearing across the secondary-side high-frequency current detector R9 when the discharge lamp is lit in a comparative example. The comparative example remains unchanged in configuration from the present embodiment except that the no-load-time high-frequency oscillating current bypass NSB is not provided.

In FIGS. 7 and 8, the intervals labeled "ON" and "OFF" on the time axis indicate the ON and OFF periods, respectively, of the switch Q1. The sum of both intervals corresponds to the period of switching. In this period, shaded portions of the high-frequency voltage waveform, i.e., positive voltage portions, pass through the resistors R18 and R10 and the diode D3, then is integrated by the resistor R9 and the capacitor C5 and applied between the base and emitter of the switch Q2 through the resistor R11 in the no-load detector NLD.

In the figures, IM denotes a main lamp current based on a main pulse voltage of 70 KHz, and IR1 denotes a first high-frequency oscillating current associated with turning on the switch Q1. In the present embodiment, since the first high-frequency oscillating current IR1 little appears in the voltage waveform across the secondary-side high-frequency current detector R9 because it is substantially absorbed and bypassed by the no-load-time high-frequency oscillating current bypass NSB.

2. No-Load Operation

At no-load time, no lamp current flows; therefore, the voltage across the secondary-side high-frequency current detector R9 becomes low, turning the switch Q2 off. Turning switch Q2 off will cause the base potential of the switch Q3 to go high, turning Q3 on. Thereby, the resistor R3 of the voltage divider VD in the high-frequency operation detector HFD is shorted, causing the voltage across resistor R2 and the capacitor C2 to go low. Therefore, the potential at the noninverting input terminal 2 of the operational amplifier OP drops to a very low value, typically of the order of 0.5V. For this reason, the high-frequency operation detect signal from the noninverting amplifier NRA goes to 0V, i.e., the second level, which is lower than a target voltage to which reference is made. In response to this high-frequency operation detect signal, the controller CC performs its shutdown function to stop the high-frequency voltage generating operation, whereby a protection operation is performed.

Figure 9:
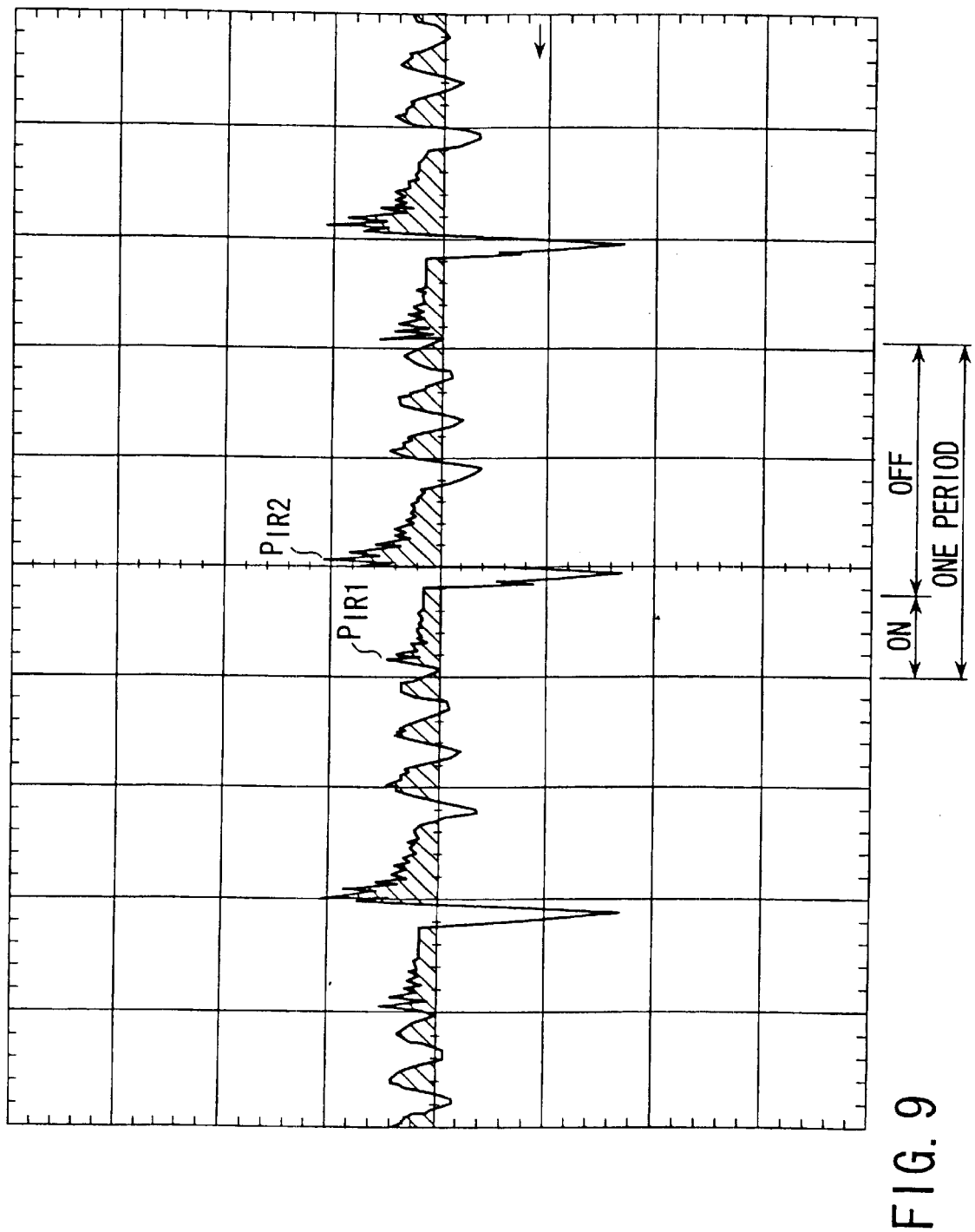
FIG. 9 is a graph illustrating a voltage waveform across the secondary-side high-frequency current detector R9 at no-load time in the first embodiment of the discharge lamp ignition device of the present invention.

FIG. 9 is a graph illustrating a voltage waveform appearing across the secondary-side high-frequency current detector R9 at no-load time in the first embodiment of the discharge lamp ignition device of the present invention.

Figure 10:
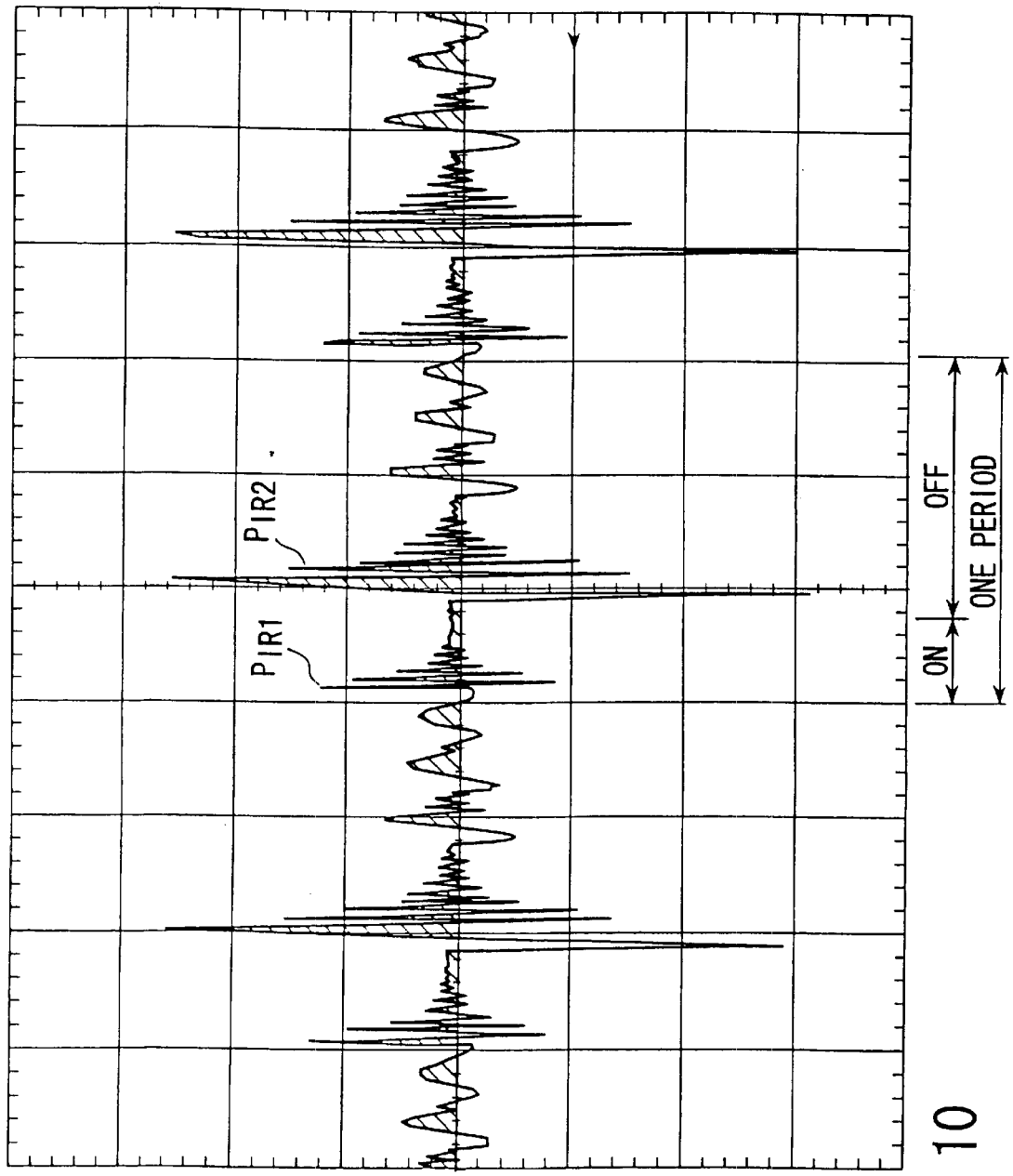
FIG. 10 is a graph illustrating a voltage waveform across the secondary-side high-frequency current detector R9 at no-load time in a comparative example.

FIG. 10 is a graph illustrating a voltage waveform appearing across the secondary-side high-frequency current detector R9 at no-load time in the comparative example.

As is evident from FIGS. 9 and 10, in the comparative example, a second high-frequency oscillating current $I_{R2}$ is contained in the voltage waveform across the secondary-side high-frequency current detector R9. The second high-frequency oscillating current $I_{R2}$, which is due to the stray capacitance CHN associated with the feeding harness line LF, has a relatively high frequency, which is of the order of MHz. In contrast, in the present embodiment, as shown in FIG. 9, the second high-frequency oscillating current $I_{R2}$ is substantially absorbed by the no-load-time high-frequency oscillating current bypass NSB and thus becomes little contained in the voltage waveform across the secondary-side high-frequency current detector R9. Accordingly, there little arises the possibility of erroneous recognition due to the second high-frequency oscillating current $I_{R2}$.

Figure 11:
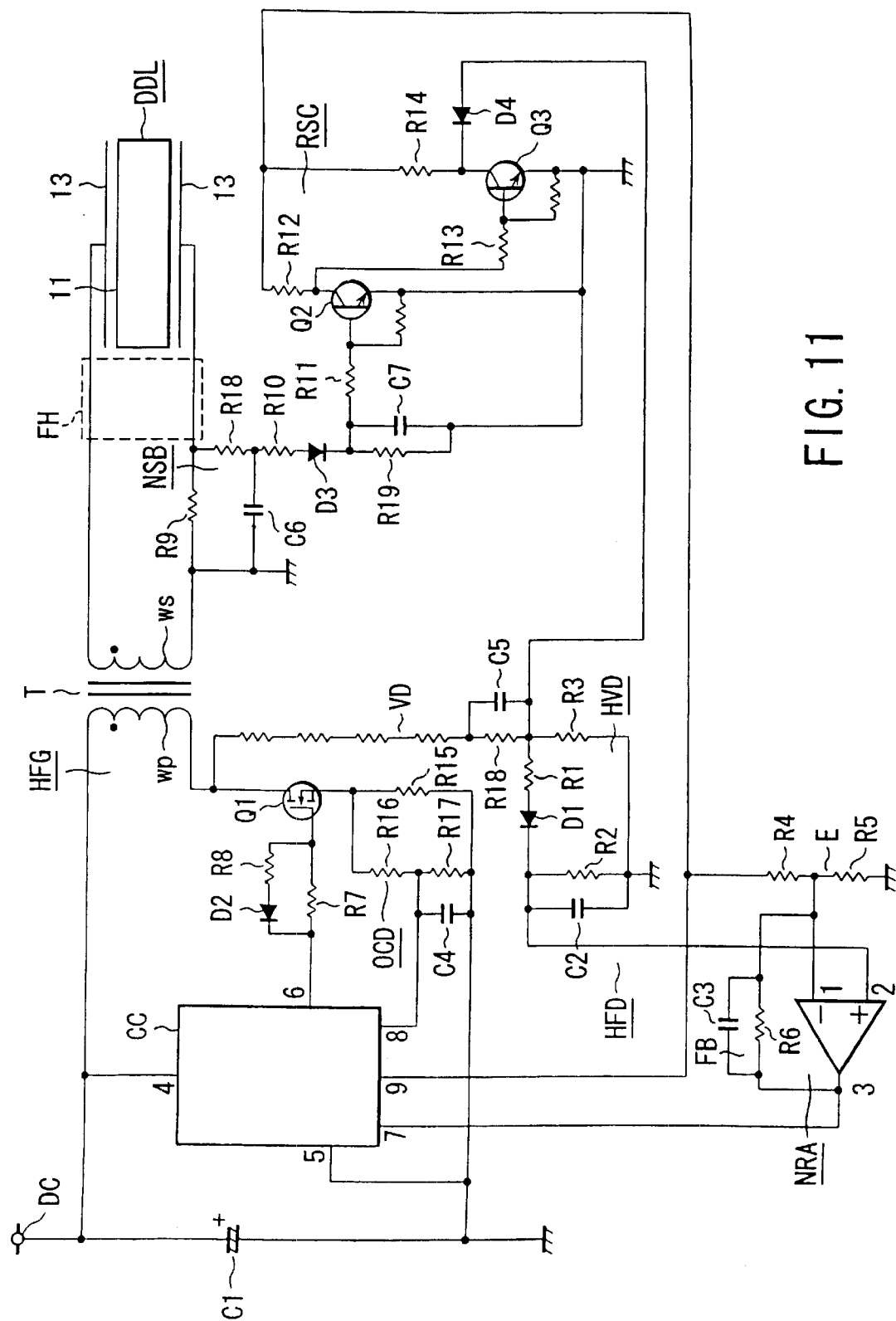
FIG. 11 is a circuit diagram illustrating a second embodiment of the discharge lamp ignition device of the present invention.

FIG. 11 is a circuit diagram of a second embodiment of the discharge lamp ignition device of the present invention. In this figure, corresponding parts to those in FIG. 1 are denoted by like reference numerals and descriptions thereof are omitted.

The second embodiment remains unchanged from the first embodiment shown in FIG. 1 in protection against no-load and overcurrent but differs in the configuration and operation of the high-frequency operation detector HFD. That is, in the high-frequency operation detector HFD, a capacitor C5 is connected in parallel with the resistor R18 of the voltage divider VD.

In this embodiment, the capacitor C5 allows high-order harmonic components in the high-frequency voltage to bypass, so that a voltage drop across the resistor R3 relatively increases because of the high-order harmonic components and as a result a voltage proportional to high-frequency power appears across the resistor R3. This voltage is applied to the switching control input terminal 7 of the controller CC as a high-frequency operation detect signal, allowing the discharge lamp DDL to be lit through substantially constant voltage control.

Figure 12:
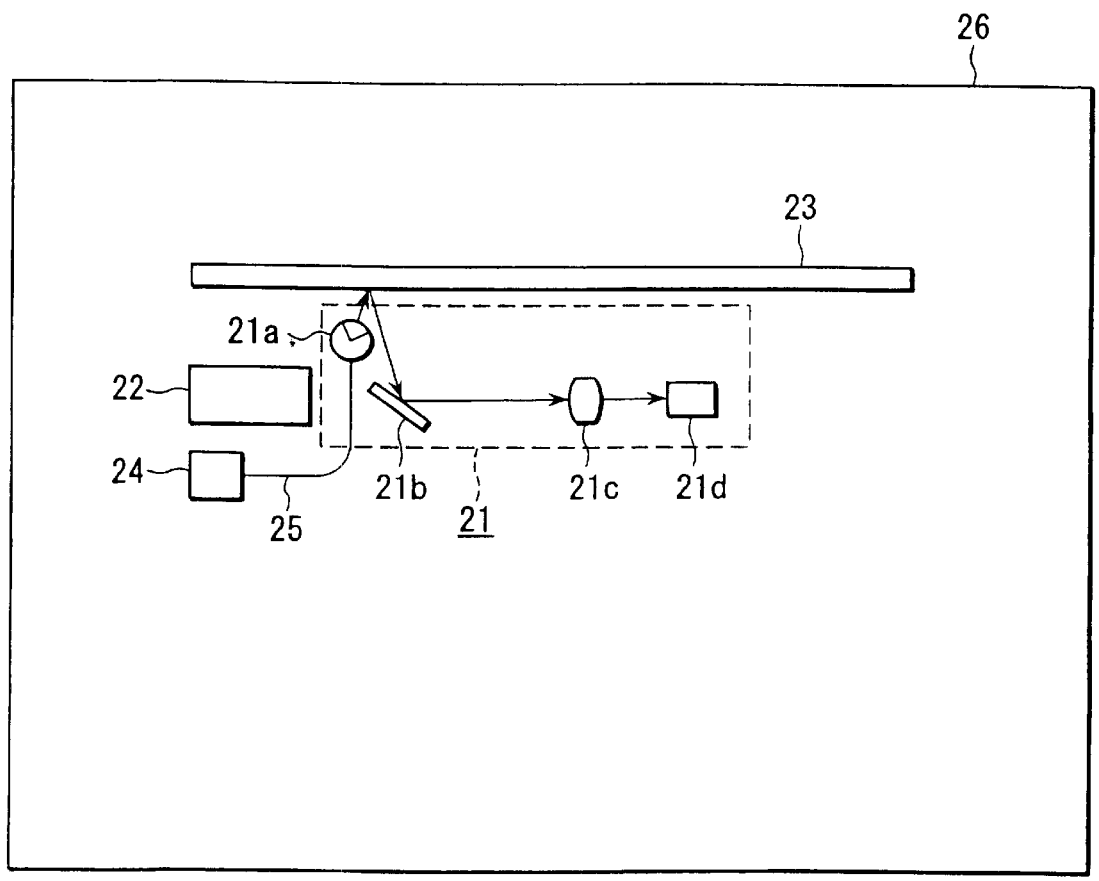
FIG. 12 is a conceptual diagram of an image reading apparatus as an example of equipment and image forming apparatus of the present invention.

FIG. 12 is a conceptual diagram of an image reading apparatus as an example of equipment and image forming apparatus of the present invention. In FIG. 12, 21 denotes a movable scanner, 22 a signal processing unit, 23 a platen, 24 an ignition circuit unit 24, 25 a feeding harness line, and 26 an enclosure.

The movable scanner 21 mainly includes a fluorescent lamp 21a, a mirror 21b, a focusing lens 21c, a charge coupled device 21d, and a driving mechanism not shown. Though not shown, the scanner can also be constructed mainly from a fluorescent lamp, a SELFOC lens, and a charge coupled device. The fluorescent lamp 21a is structured as shown in FIGS. 2 to 4. An outgoing light beam emerging from its aperture is directed onto an original (not shown) placed on the platen 23. The reflected light from the original is reflected by the mirror 21b and then focused by the lens 21c onto the charge coupled device (CCD) 21d.

The movable scanner 21 is moved relative to the surface of the platen 23 to scan the original. The signal processing unit 22 processes an output signal of the receiver 21b to form an image signal. The feeding harness line 25 is connected between the ignition circuit 24 and the fluorescent lamp 21a. The above components are each housed in the enclosure 26.

While the scanner 21 is moving along the platen 23, the charge coupled device 21d receives reflected light from the surface of the original in such a way as to scan the original in a direction perpendicular to the direction in which the scanner moves.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ignition device which ignites a discharge lamp comprising:

a discharge lamp including a dielectric discharge container filled with a discharge medium; a pair of electrodes at least one of which is disposed on the outer surface of the discharge container and between which a discharge is generated in the container;

high-frequency voltage generator, comprising a switch configured to generate a high-frequency voltage through high-frequency switching and an output transformer which outputs a high-frequency voltage, configured to ignite the discharge lamp by applying the high-frequency output voltage of the output transformer between paired electrodes of the discharge lamp;

a feeding harness line having its one end connected to the high-frequency voltage generator and its other end connected to the discharge lamp, the harness line having parallel conductors whose length is 200 mm or more; and a lowpass filter which bypasses a high-frequency oscillating current which flows at no-load time mainly due to stray capacitance associated with the feeding harness line.

2. The ignition device according to claim 1, wherein the lowpass filter comprises no-load detector configured to detect a no-load state based on a current which flows in the secondary circuit of the output transformer; and high-frequency oscillating current bypass coupled to the no-load detector configured to bypass a high-frequency oscillating current which flows in the no-load detector at no-load time mainly due to the stray capacitance associated with the feeding harness line to thereby reduce the high-frequency oscillating current to flow in the no-load detector.

3. The ignition device according to claim 2, further comprising:

controller, when the no-load detector detects a no-load state, configured to control the high-frequency voltage generator to protect an ignition circuit.

4. The ignition device according to claim 3, further comprising:

high-frequency operation detector configured to detect a high-frequency voltage to output and supply a high-frequency operation detect signal to the controller, and wherein the controller, upon receiving the high-frequency operation detect signal, feedback controls the switch so that the high-frequency operation detect signal goes to a first level and, when the high-frequency operation detect signal goes to a second level, protects the switch, and the no-load detector, when detecting a no-load state, forces the high-frequency operation detect signal to go to the second level.

5. The ignition device according to claim 4, wherein the high-frequency operation detector detects a lamp voltage or current of the discharge lamp and the controller PWM (pulse width modulation) controls the switch of the high-frequency voltage generator so as to make the lamp voltage or current constant.

6. The ignition device according to claim 1, wherein the feeding harness line is set to be 20 mm or less in the spacing between its parallel conductors.

7. A discharge lamp ignition device comprising:
   a discharge lamp including a discharge container filled with a discharge medium mainly includes a rare gas and a pair of electrodes at least one of which is disposed on the outer surface of the discharge container;
   a feeding harness line having its one end connected to the discharge lamp, the harness line including parallel conductors the length of which is 200 mm or more; and
   an ignition circuit connected to the other end of the feeding harness line to ignite the discharge lamp,
   the ignition circuit including:
      high-frequency voltage generator, comprising a switch configured to generate a high-frequency voltage through high-frequency switching and an output transformer which outputs a high-frequency voltage, configured to ignite the discharge lamp by applying the high-frequency output voltage of the output transformer between the paired electrodes of the discharge lamp;
      no-load detector configured to detect a no-load state based on a current which flows in the secondary circuit of the output transformer;
      high-frequency oscillating current bypass coupled to the no-load detector configured to bypass a high-frequency oscillating current which flows in the no-load detector at no-load time mainly due to the stray capacitance of the feeding harness line to thereby reduce the high-frequency oscillating current to flow in the no-load detector; and
      controller, when the no-load detector detects a no-load state, configured to control the high-frequency voltage generator to protect the ignition circuit.

8. The ignition device according to claim 7, further comprising:
   high-frequency operation detector configured to detect a high-frequency voltage to output and supply a high-frequency operation detect signal to the controller, and
   wherein the controller, upon receiving the high-frequency operation detect signal, feedback controls the switch so that the high-frequency operation detect signal goes to a first level and, when the high-frequency operation detect signal goes to a second level, protects the switch, and the no-load detector, when detecting a no-load state, forces the high-frequency operation detect signal to go to the second level.

9. The ignition device according to claim 8, wherein the high-frequency operation detector detects a lamp voltage or current of the discharge lamp and the controller PWM (pulse width modulation) controls the switch of the high-frequency voltage generator so as to make the lamp voltage or current constant.

10. The ignition device according to claim 7, wherein the feeding harness line is set to be 20 mm or less in the spacing between its parallel conductors.

11. A discharge lamp ignition device comprising:
   a discharge lamp including a discharge container filled with a discharge medium mainly including a rare gas and a pair of electrodes at least one of which is disposed on the outer surface of the discharge container, the interelectrode internal stray capacitance within the discharge container being CIE and the interelectrode creepage stray capacitance across the surface of the discharge container being CSF;
   a feeding harness line having its one end connected to the discharge lamp, the harness line including parallel conductors and having a stray capacitance of CHN associated with the parallel conductors; and
   an ignition circuit connected to the other end of the feeding harness line to ignite the discharge lamp,
   the ignition circuit including:
      high-frequency voltage generator, comprising a switch configured to generate a high-frequency voltage through high-frequency switching and an output transformer which outputs a high-frequency voltage, for igniting the discharge lamp by applying the high-frequency output voltage of the output transformer between the paired electrodes of the discharge lamp;
      no-load detector configured to detect a no-load state based on a current which flows in the secondary circuit of the output transformer;
      high-frequency oscillating current bypass coupled to the no-load detector configured to bypass a high-frequency oscillating current which flows in the no-load detector at no-load time mainly due to the stray capacitance of the feeding harness line to thereby reduce the high-frequency oscillating current to flow in the no-load detector; and
      controller, when the no-load detector detects a no-load state, configured to control the high-frequency voltage generator to protect the ignition circuit,
      the capacitances CIE, CSF and CHN being set to satisfy CIE>CHN>CSF.

12. The ignition device according to claim 11, further comprising:
   high-frequency operation detector configured to detect a high-frequency voltage to output and supply a high-frequency operation detect signal to the controller, and
   wherein the controller, upon receiving the high-frequency operation detect signal, feedback controls the switch so that the high-frequency operation detect signal goes to a first level and, when the high-frequency operation detect signal goes to a second level, protects the switch, and the no-load detector, when detecting a no-load state, forces the high-frequency operation detect signal to go to the second level.

13. The ignition device according to claim 12, wherein the high-frequency operation detector detects a lamp voltage or current of the discharge lamp and the controller PWM (pulse width modulation) controls the switch of the high-frequency voltage generator so as to make the lamp voltage or current constant.

14. The ignition device according to claim 11, wherein the feeding harness line is set to be 20 mm or less in the spacing between its parallel conductors.

15. Equipment comprising:
   an equipment body; and
   a discharge lamp ignition device incorporated in the equipment body and defined in any one of claims 1 through 14.

16. An image forming apparatus comprising:
   an image forming apparatus body equipped with a movable scanner; and
   a discharge lamp ignition device defined in any one of claims 1 through 14 and having a discharge lamp incorporated into the movable scanner and an ignition circuit placed in position in the image forming apparatus body.

* * * * *